April 30, 1929.  J. MERRYWEATHER  1,711,240

HANGER FOR DOWN SPOUTS AND THE LIKE

Filed Sept. 1, 1927

Inventor
James Merryweather
By C.A. Snow & Co
Attorneys

Patented Apr. 30, 1929.

1,711,240

UNITED STATES PATENT OFFICE.

JAMES MERRYWEATHER, OF GREENCASTLE, INDIANA.

HANGER FOR DOWN SPOUTS AND THE LIKE.

Application filed September 1, 1927. Serial No. 216,887.

This invention relates to a hanger designed primarily for holding down spouts to walls of buildings, one of the objects being to provide a hanger having simple and efficient means for binding upon the down spout and for holding it fixed relative to the hanger or yoke.

A further object is to provide a device of this character which is simple in construction and can be made at low cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from spirit of the invention.

In the accompanying drawings, the preferred form of the invention has been shown.

In said drawings.

Figure 1:
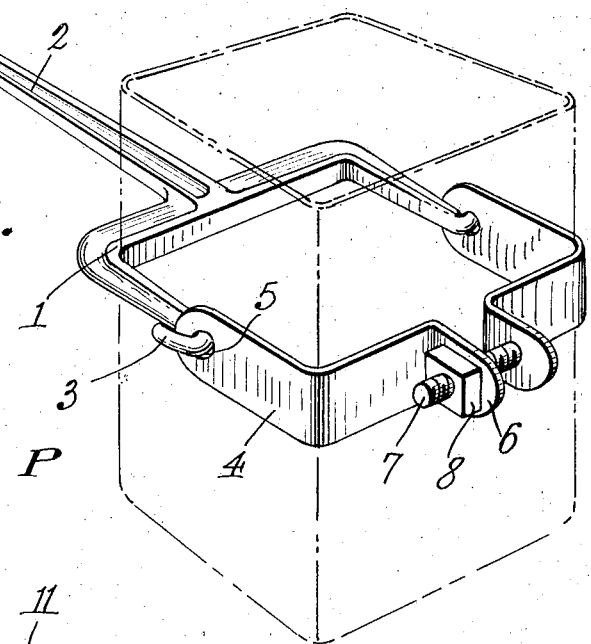
Figure 1 is a perspective view of the hanger, the position of a down spout therein being indicated by broken lines.

Referring to the figures by characters of references 1 designates an angular yoke designed primarily for straddling an angular pipe such as indicated at P. This yoke has a shank 2 extending therefrom and the arms of the yoke are provided with integral hooks 3. Each of these hooks engages an angular clamp member 4 which can be formed of sheet metal, there being an opening 5 in one end portion of the clamp member to receive the hook while the other end portion of the clamp member has an outturned ear 6. These ears are designed to receive a clamping screw 7 which can be engaged by a nut 8.

In using this yoke the shank 2 is placed in engagement with a wall in the usual manner and the pipe is arranged within the yoke. Clamping members 4 are then placed in engagement with the hooks 3 so as to brace the outer corners of the pipe after which the ears 6 are drawn together by means of the bolt 7 and the nut 8. Thus the pipes are firmly gripped and cannot become displaced relative to the hanger.

Figure 2:
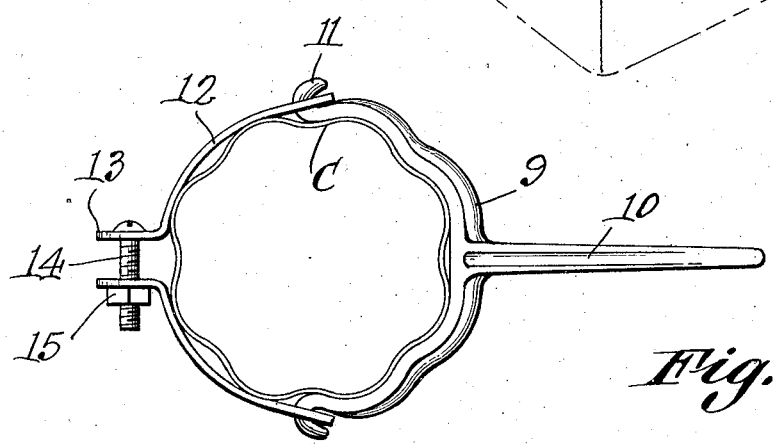
Figure 2 is a plan view of a slightly modified form of hanger, a down spout being also shown engaged thereby.

Obviously the same principle can be embodied in a structure designed for holding a round or substantially round pipe as shown in Figure 2. In this structure the yoke 9, instead of being anchored, is substantially arcuate and has a shank 10 for engaging a supporting structure. The arms of the yoke have hooks 11 for engaging arcuate clamping strips 12. These strips have outturned ears 13 for engagement by a clamping bolt 14 having a nut 15. This hanger is applied to the pipe in the same manner as the one already described and can be used either with cylindrical or with waved or corrugated pipes one of which has been indicated at C.

Figure 3:
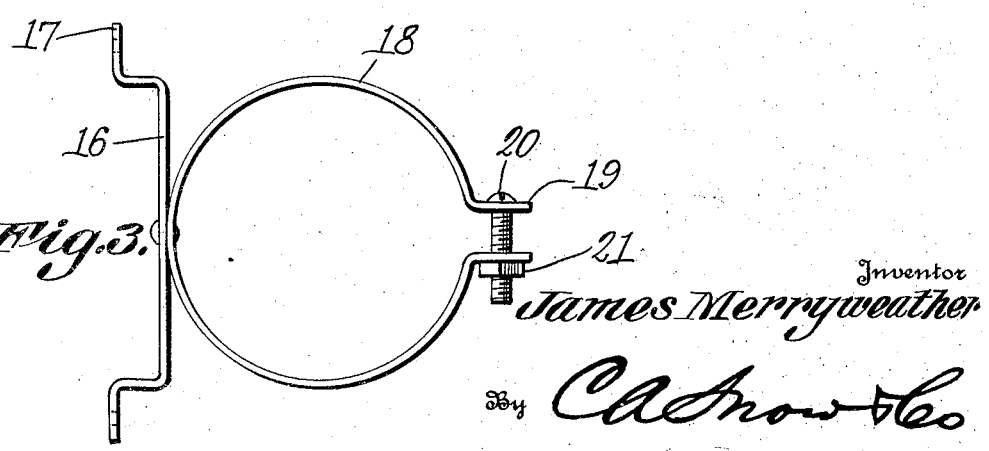
Figure 3 is a plan view of another form of hanger.

Another form of the invention has been illustrated in Figure 3 wherein an attaching member 16 in the form of a metal strip is provided, this member having terminal ears 17 for the reception of nails or the like whereby the hanger can be attached to a wall. Riveted or otherwise connected to the strips 16 is a stripling 18 having outturned ears 19 at its ends for the reception of a clamping bolt 20 engaging a screw 21. Obviously by tightening the bolt the ring 18 can be contracted about a pipe embraced thereby and the pipe can thus be held securely in place.

What is claimed is:

A hanger of the class described including a yoke, a support engaging shank integral with the yoke, hooks integral with the ends of the yoke, an apertured clamping strip detachably engaging each of the hooks, an outturned ear on each of said strips, and a tightening bolt engaging the ears and cooperating therewith to bind the strips and the yoke upon a structure embraced thereby.

In testimony that I claim the foregoing as my own, I have hereto affixed my signature.

JAMES MERRYWEATHER.